Jan. 9, 1962   B. H. MOSBACHER   3,016,121
HYDRAULICALLY OPERATED CLUTCH
Filed May 28, 1959   2 Sheets-Sheet 1

Inventor
Bruce H. Mosbacher
By
McCanna, Morsbach & Pillote
Atty's

Inventor
Bruce H. Mosbacher

By McCanna, Morsbach & Pillote
Atty's

United States Patent Office 3,016,121
Patented Jan. 9, 1962

3,016,121
HYDRAULICALLY OPERATED CLUTCH
Bruce H. Mosbacher, Rockford, Ill., assignor to Roper Hydraulics, Inc., Rockford, Ill., a corporation of Illinois
Filed May 28, 1959, Ser. No. 816,464
12 Claims. (Cl. 192—91)

This invention relates to an hydraulically operated multiple disk clutch.

An important object of this invention is to provide an hydraulically operated multiple disk clutch of the type wherein the cylinder and the clutch actuating piston are carried by one of the rotating members of the clutch, which clutch has an improved arrangement for supplying fluid to the rotating cylinder to provide a running seal therewith.

A more particular object of this invention is to provide an hydraulically operated clutch of the type described in which fluid is supplied to the rotating cylinder through an annular distributor ring which is fluid pressure loaded against the cylinder.

Another object of this invention is to provide an hydraulically operated multiple disk clutch drive and driven members rotatably supported in a clutch housing and wherein the clutch is normally spring engaged and the hydraulically operated piston for disengaging the clutch is carried by the driven member so that, during the application of fluid pressure to the piston, the driven member is normally stopped.

Still another object of this invention is to provide an hydraulically operated multiple disk clutch having a clutch operating piston carried by one of the rotatable members of the clutch and which is not subject to erratic operation due to the centrifugal force on the fluid in the piston cylinder.

Yet another object of this invention is to provide an hydraulically operated multiple disk clutch having provision for automatically retarding rotation of the output member of the clutch when the clutch is disengaged.

These, together with various ancillary objects and advantages of this invention will be more readily appreciated as the same becomes better understood by reference to the following detailed description when taken in connection with the accompanying drawings wherein.

Figure 1:
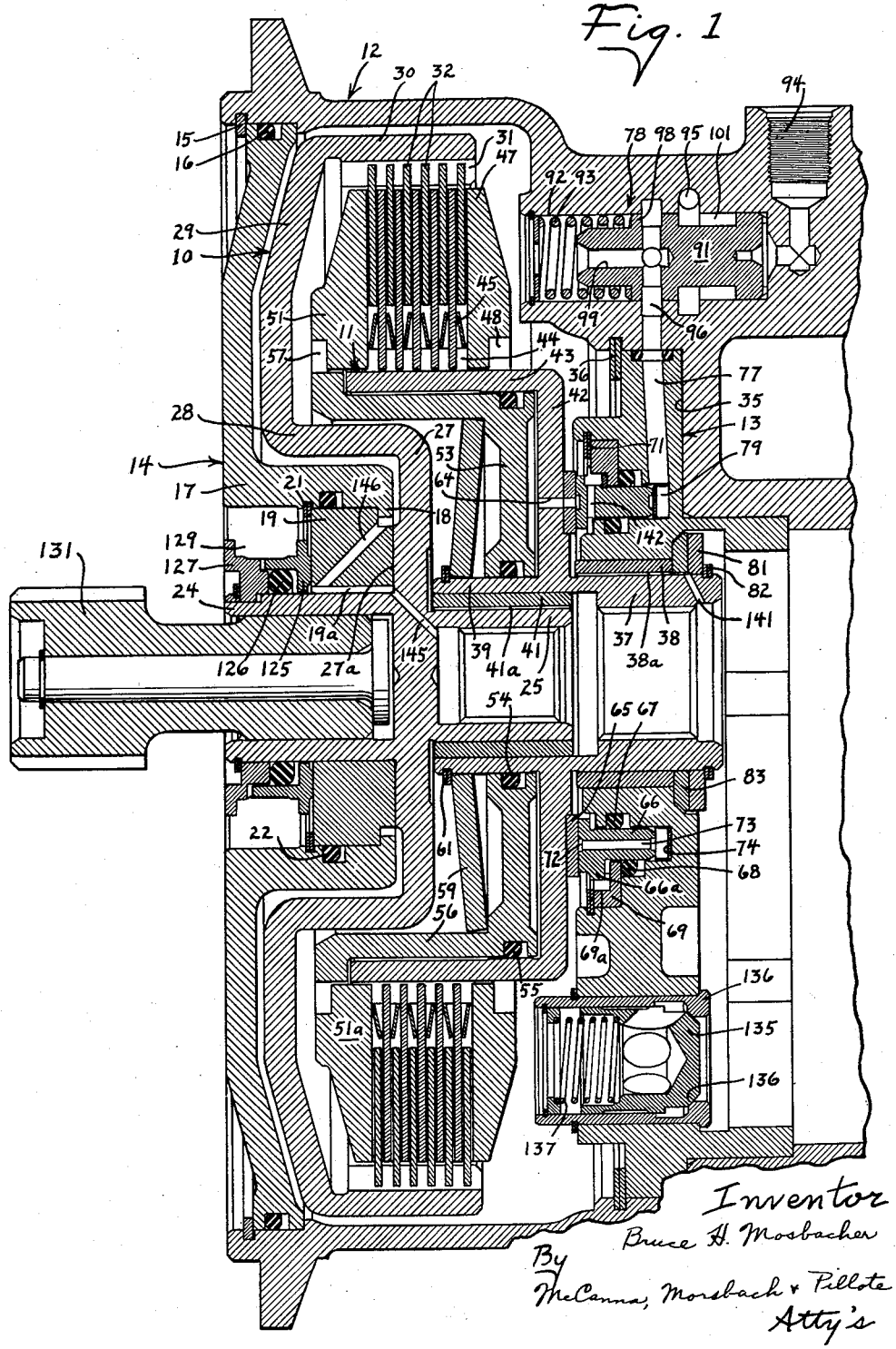
FIGURE 1 is a sectional view through the clutch and showing the same in its engaged position.

The clutch of the present invention is of the type disclosed but not claimed in the co-pending application of Ralph F. Hornbach for "Pump Control System," Serial No. 805,166, filed April 9, 1959. In general, the clutch includes an input member 10 and an output member 11 rotatably mounted in a housing 12 between inner and outer end walls 13 and 14 respectively. The outer wall 14 is removably retained in position on the housing by a clamp ring 15 and is sealed thereto by an O-ring 16. The end wall has a reentrant portion 17 which terminates in an inwardly extending flange 18 and which supports a combined radial and thrust bearing 19. The last-mentioned bearing abuts against the flange 18 and is retained in position by rings 21, and O-ring 22 being provided for sealing the bearing to the outer end wall. The input member 10 of the clutch includes a shaft portion composed of an outer internally splined sleeve 24 which is rotatably supported in the bearing 19 and an inner internally splined sleeve 25. The input member also includes a cage having a central wall 27 formed with a thrust face 27a which engages the inner face of the bearing 19; an axially extending wall 28 which surrounds the reentrant sleeve 17; a generally radially extending wall 29, and an outer inwardly facing sleeve 30. The outer sleeve of the cage has longitudinally extending keyways 31 formed therein and a plurality of clutch disks 32 have keys thereon slidably and non-rotatably supported in the keyways.

The inner wall 13 abuts against a shoulder 35 in the housing and is retained in position by split rings 36. The output member 11 of the clutch includes a shaft portion having an inner sleeve 37 rotatably supported in a bearing 38 on the inner wall 13, and an outer sleeve 39 which carries a bearing 41 to rotatably support the inner sleeve of the input clutch member. The output member also includes a cage having a generally radially extending wall 42 and an axial sleeve 43 which extends outwardly from the wall and is spaced radially inwardly from the sleeve 30 on the input member. The sleeve 43 has a plurality of longitudinally extending keyways 44 therein and a plurality of clutch disks 45 are slidably and non-rotatably supported on the keyways, and interleaved with the clutch disks 32 on the input member. A stationary pressure applying member 47 is disposed at one end of the stack of clutch disks and has a portion extending into the keyways 44 to non-rotatably connect the member 47 to the output member. A flange 48 on the sleeve 43 engages the pressure applying member 47 to limit movement of the same. A movable pressure applying member 51 is disposed at the other side of the stack of clutch disks and has keys 51a thereon which are slidably and non-rotatably mounted in the keyways 44.

The radial wall 42 and the inner and outer sleeves 39 and 43 on the output member define an annular cylinder and an annular piston 53 is slidably disposed in the cylinder and sealed thereto by inner and outer O-rings 54 and 55. An axially extending sleeve 56 is provided at the outer periphery of the cylinder, which sleeve extends along the sleeve 43 of the output member and has a radially extending flange 57 at the outer end thereof which engages the movable pressure applying member 51. A spring 59 is provided for yieldably urging the piston and the pressure applying member 51 connected thereto in a direction to press the clutch disks 32 and 45 into driving engagement. The spring 59 is advantageously in the form of a normally concavo-convex disk which surrounds the sleeve 39 on the output member and engages a stop ring 61 thereon. The outer periphery of the disk engages the piston 53 and the strength of the disk spring is selected so as to apply sufficient pressure to the clutch disks to transmit the maximum desired torque from the input member to the output member, when the clutch is in its engaged position.

Fluid is selectively supplied to the cylinder in the driven member 11 of the clutch to move the piston and the pressure applying member 51 to its released position. In accordance with the present invention, the fluid is introduced and withdrawn from the cylinder in the driven member through a passage 64 which is located radially outwardly of the inner periphery of the cylinder and, as shown herein, is formed in the radially extending wall portion 42 of the driven member. An annular wear plate 65 is rigidly affixed as by brazing to the side of the wall portion 42 opposite the cylinder, and an annular distributor ring 66 is slidably and non-rotatably supported on the inner wall of the housing with one face in running engagement with the wear plate. An inner O-ring 67 is disposed in a groove in the end wall and slidably engages the ring 66, and an outer O-ring 68 is disposed in a recess in the end wall 13. An annular O-ring retainer 69 is provided to prevent dislodgment of the outer O-ring 68 from its recess, which retainer is held in position on the inner wall 13 by split rings 71. One or more lugs 66a (see FIG. 1) are preferably formed on the distributor ring and extend into notches 69a in the retainer ring to prevent rotation of the distributor ring while permitting free axial sliding movement thereof. A distributor groove 72 is formed in the end face of the distributor ring which engages the driven member of the clutch, which groove registers with the passages 64 formed in the driven member, and one or more axial passages 73 are formed in the ring 66 to supply fluid from the chamber 74 at the inner end of the ring, to the passages 64 in the driven member of the clutch. Fluid is selectively supplied to the inner end of the distributor ring through a passage 77 formed in the inner end wall 13 and in the housing 12, under the control of a control valve 78 to be described more fully hereinafter. A light spring, herein shown in the form of a wave washer 79 engages the inner end of the distributor ring to initially press the ring against the output member of the clutch to form a running seal therebetween. Thus, when the clutch is engaged and the output member is rotating relative to the distributor ring, the ring is pressed thereagainst solely by the relatively light spring pressure. When disengaging the clutch, the actuating fluid also applies pressure against the rear face of the ring to increase the pressure for urging the ring against the output member. However, the output member 42 stops within a short time after the application of fluid pressure to the piston to disengage the clutch, so that there is no prolonged relative rotation between the output member and the distributor ring under these conditions. A thrust washer 81 is carried by the sleeve 37 on the output member and engages a stop ring 82 thereon. The thrust washer is arranged to engage a bearing 83 to limit axial movement of the driven member in response to the thrust applied thereto by the distributor ring 66. The elements 81 and 83 may advantageously be formed of a material which will provide a braking action when pressed against each other, so that the fluid pressure applied to the distributor ring will also apply a braking pressure to the elements 81 and 83 to retard rotation of the output member.

Figure 4:
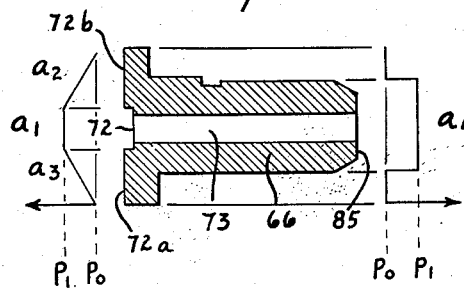
FIG. 4 is a diagrammatic view illustrating the fluid pressure distribution on opposite ends of the fluid distributor ring.

In order to minimize wear between the interengaging faces of the distributing ring 66 and the wear plate 65, the width of the groove 72 and the width of the seal faces 72a and 72b (see FIG. 4) at one end of the distributor ring are correlated with the area of the face 85 at the other end of the ring to which fluid under pressure is applied, so that the total axial hydraulic thrusts on opposite ends of the ring substantially counterbalance each other. With this arrangement, the fluid pressure at the inner end face 85 of the ring will be transmitted hydraulically to the driven member 11 of the clutch. It is considered that this will be best understood from the diagrammatic illustration in FIGURE 4 of the different pressures acting on the end faces of the distributor ring. When the control valve 78 is moved to a position to supply fluid under pressure to the clutch piston, this pressure designated Pl is applied across the end face 85 of the distributor ring. This pressure is also applied, in a relatively opposite direction, to the area defined by the groove 72 in the other end face of the ring. In addition, the pressure on the seal faces 72a and 72b will decrease in a direction radially across the seal faces, as indicated by the arrows to the pressure in the clutch housing designated Po. The gradient pressure acting across the seal faces 72a and 72b will partially counterbalance the axial hydraulic thrust on the ring 66, due to the pressure acting on the other end face 85. The width of the groove 72, to which full actuating pressure is applied, is selected so that the area of the groove is less than the area of the other end face 85 that the total hydraulic thrust on the outer side of the distributor ring will be very nearly equal to, but preferably slightly less than, the total hydraulic thrust acting on the inner end face 85. Since the same fluid pressures which act on the groove 72 and on the seal faces 72a and 72b, also act on the driven element, it is apparent that the hydraulic thrust supplied to the end face 85 of the ring is hydraulically transmitted to the driven member 42.

In hydraulically operated clutches, difficulties have heretofore been encountered due to the centrifugal force on the fluid in the clutch cylinder, when the latter is rotating at a relatively high speed. This centrifugal force produces an axial pressure on the piston which tends to cause erratic operation of the clutch. However, in the present clutch construction, the clutch is normally spring engaged and hydraulically operated to its disengaged position. Consequently, when fluid is supplied the clutch cylinder, the clutch is disengaged and the driven element stops rotating so that the fluid therein is not subjected to centrifugal force. Engagement of the clutch is effected by communicating the passage 64 and the cylinder to below pressure in the clutch housing. Since the passage 64 for admitting fluid to the clutch cylinder, is spaced radially outwardly from the inner periphery of the actuating piston 53, this passage will prevent the pressure in the cylinder at the point where it communicates with the cylinder for building up above the pressure in the clutch housing, due to the centrifugal force on the fluid. Thus, when the clutch is engaged and the driven member rotating at a high speed, the centrifugal force on that fluid which remains in the cylinder will tend to increase the pressure on the piston in the region outwardly of the passage 64, but will decrease the pressure on the piston in the region inwardly of the passage. In this manner, the effect of centrifugal force on the fluid in the clutch piston is substantially counteracted.

Figure 3:
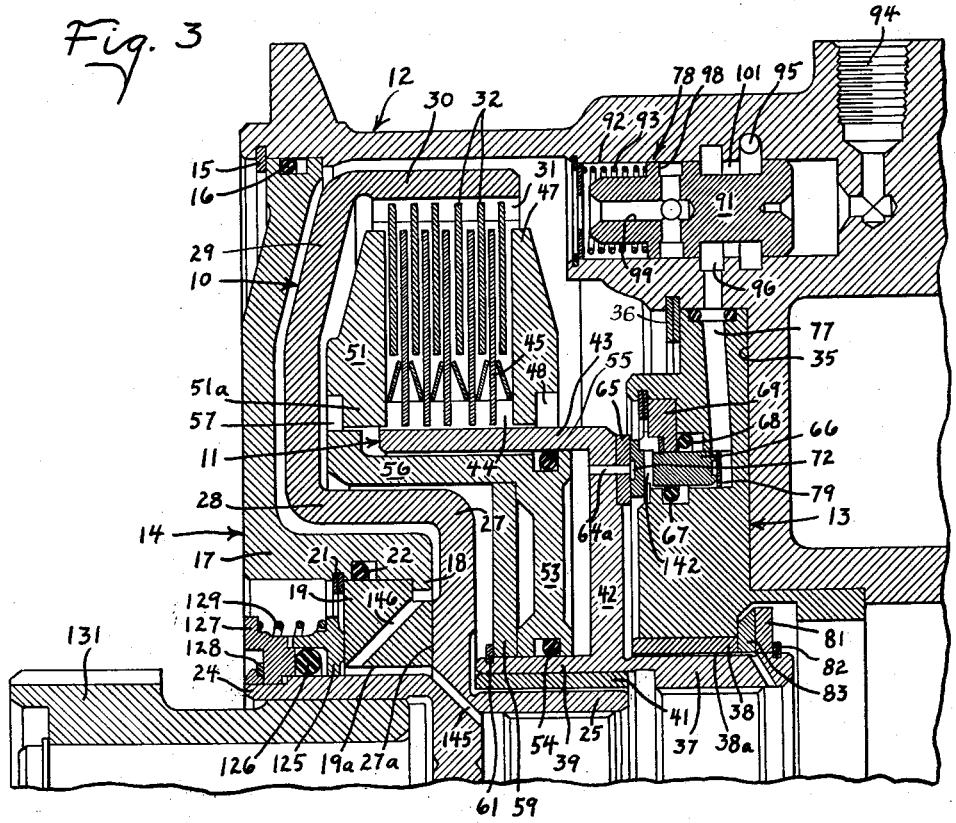
FIG. 3 is a fragmentary sectional view through a modified clutch and illustrating the same in its disengaged position.

The embodiment of FIG. 3 is generally similar to that shown in FIG. 1, and like numerals are utilized to designate corresponding parts. In FIG. 3, the passage 64a has been shifted radially outwardly relative to the piston, and the collector ring 66 shifted accordingly. With this arrangement, the centrifugal force on the fluid which remains in the cylinder will aid in exhausting the fluid from the cylinder, when the clutch is engaged, and will serve to further reduce the pressure in the clutch cylinder and increase the clutch engaging pressure to prevent slipping of the clutch at high speeds.

The control valve 78 for controlling the application of fluid pressure to the clutch is conveniently mounted in the clutch housing 12 and, as shown herein, comprises a spool 91 which is slidably disposed in a bore 92 in the housing. The spool is normally urged to a retracted position by a spring 93 and is moved in the other direction in any desired manner. In the specific embodiment illustrated, the valve 91 is arranged to be hydraulically operated by fluid under pressure from a source not shown which is applied to the end of the spool through a passage 94. The other end of the spool is communicated with the relatively low pressure in the housing 12 so that the control pressure applied through passage 94 only has to slightly exceed the pressure in the housing to actuate the valve.

The valve has an inlet 95 connected to a suitable source of fluid pressure, such as a pump, and a discharge passage 96 which communicates with the passage 77, leading to the clutch cylinder. The spool has a peripheral groove 98 formed therein which is communicated through passages 99 in the spool with the interior of the housing 12, to normally exhaust fluid from the clutch cylinder. The spool also has a peripheral groove 101 therein arranged to extend between the axially spaced inlet and outlet passages 95 and 96, to supply fluid under pressure from the inlet passage to the outlet passage, when the control valve is moved to the right hand position shown in FIG. 3.

Figure 2:
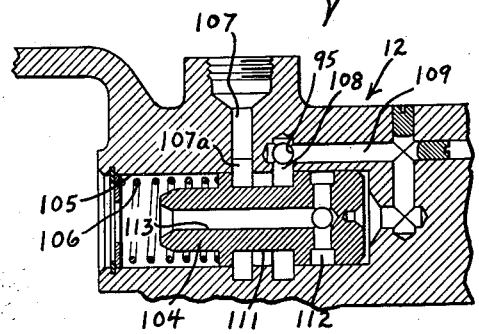
FIG. 2 is a sectional view through a pressure regulating valve for controlling the pressure which is supplied to operate the clutch.

In order to prevent damage to the clutch, due to the application of excessive pressure thereto, a regulating valve may be provided in the line leading to the clutch. This regulating valve, as best shown in FIG. 2, includes a spool 104 which is slidably supported in a bore 105 in the housing 12. One end of the spool communicates with the low pressure in the housing, and a spring 106 is provided for normally urging the spool to a retracted position as shown in FIG. 2. The unregulated fluid pressure is supplied to the regulating valve through a passage 107 to an inlet groove 107a, and the regulated output pressure is delivered to the outlet groove 108 leading to the inlet passage 95 of the control valve. The regulated output pressure is also supplied through a passage 109 to the inner end of the spool 104 opposite the spring 106. The spool has a peripheral groove 111 therein dimensioned to span the axially spaced inlet and outlet grooves 107a and 108, when the spool is in its fully retracted position, to supply fluid under pressure from the inlet passage 107 to the passage 95. The spool also has a peripheral groove 112 therein spaced axially from the groove 111 a distance less than the axial width of the outlet groove 108. The groove 112 is connected through passages 113 in the spool to the low pressure within the clutch housing. If the pressure at the outlet passage exceeds the desired pressure determined by the spring 106, this pressure acting on the inner end of the spool will move the same to the left as viewed in FIG. 2 until the groove 112 partially communicates with the outlet groove 108 to by-pass the excess fluid pressure.

The clutch is arranged to be operated completely immersed in fluid and for this purpose a rotary seal 125 is supported on the sleeve 24 of the input member and sealed thereto by an O-ring 126. A ring 127 is mounted on the sleeve 24 and is retained thereon by a split ring 128. The ring 127 holds the O-ring on the shaft and non-rotatably engages the rotary seal member 125 to drive the same with the input member of the clutch. A spring 129 is disposed between the ring 127 and the rotary seal member, to yieldably urge the latter into running engagement with the outer face of the bearing member 19. The input member is driven, as by a stub shaft 131 having a splined end which engages the internally splined sleeve 24.

The clutch is specifically designed for use with a fluid pump and the interior of the clutch housing is connected to the inlet of the pump. Fluid from the pump is supplied to the chamber at the right hand side of the inner wall 13, and a pressurizing valve 135 (see FIG. 1) is disposed in the inner wall to maintain a preselected pressure differential between the pressure at the right hand side of the inner wall, and the pressure at the interior of the clutch housing. As shown, the pressurizing valve 135 is yieldably urged against its seat 136 by a spring 137. When the pressure applied to the head of the pressurizing valve reaches a preselected value, it overcomes the spring and allows the valve to open to permit fluid to flow into the clutch housing and back to the inlet of the pump. Advantageously, passages are provided so that fluid under the relatively higher pressure at the right hand side of the inner wall 13 must flow through the bearings and into the clutch housing. In particular, the bearing 38 has a groove 38a therein and a passage 141 is provided in the sleeve 37 to pass the fluid through the bearing 38. A radial passage 142 is provided in the distributor ring 66, intermediate the axial passages 73 therein so that the fluid from the bearing 38 may pass through the distributor ring and into the interior of the clutch housing for return to the pump inlet. The bearing 41 similarly has a groove 41a therein which communicates at one end with the fluid pressure at the inner side of the wall 13, and at the other end with the interior of the clutch housing. The bearing 19 has a longitudinal groove 19a and a passage 145 is formed in the input member to supply fluid under pressure to one end of the passage. The other end of the passage 19a is communicated through a diagonally extending passage 146 in the bearing 19 with the interior of the clutch housing at a point outwardly of the face 27a. In this manner, fluid is supplied to the bearing 19 to flow axially through and lubricate the sleeve 24, and to also flow radially across the thrust face 27a to lubricate the same.

I claim:

1. A multiple disk clutch including a housing, coaxial drive and driven members rotatably mounted in said housing, first and second sets of coaxial clutch elements respectively mounted on said drive and driven members and interleaved to form a stack, a first pressure applying member on said driven member at one side of said stack, a second pressure applying member mounted on said driven member for rotation therewith and for axial movement relative thereon, means including a spring carried by said driven member and engaging said second pressure applying member for urging the latter in a direction to compress the stack of clutch elements and engage the clutch, means including a radially extending wall portion on said driven member defining an annular cylinder, an annular piston in said cylinder engageable with said second pressure applying member for moving the latter axially away from the stack of clutch elements when fluid under pressure is supplied to said cylinder, said radially extending wall portion having a passage extending therethrough and spaced radially outwardly from the axis of said driven member, an annular distributor ring means mounted on said housing for axial sliding movement and having one end face thereof engaging said wall portion in overlying relation to said passage therein, means for urging said ring means axially into close running fit with said wall portion, and means including a passage in said ring means for supplying fluid under pressure through said passage in the wall portion to said cylinder.

2. A multiple disk clutch including a housing, coaxial drive and driven members rotatably mounted in said housing, first and second sets of coaxial clutch elements respectively mounted on said drive and driven members and interleaved to form a stack, a first pressure applying member on said driven member at one side of said stack, a second pressure applying member mounted on said driven member for rotation therewith and for axial movement relative thereto, means including a spring carried by said driven member and engaging said second pressure applying member for urging the latter in a direction to compress the stack of clutch elements and engage the clutch, means including a radially extending wall portion on said driven member defining an annular cylinder, an annular piston in said cylinder engageable with said second pressure applying member for moving the latter axially away from the stack of clutch elements when fluid under pressure is supplied to said cylinder, said radially extending wall portion having a passage extending therethrough and spaced radially outwardly from the axis of said driven member, an annular distributor ring means mounted on said housing for axial sliding movement and having one end face thereof engaging said wall portion in overlying relation to said passage therein, said end face having passage means extending therethrough from said one end face to the other end face thereof, and means for selectively applying fluid under pressure to said other end face of said ring means to pressure load said ring means toward said wall portion into close running fit therewith and to supply fluid under pressure to said cylinder to actuate said piston.

3. The combination of claim 2 including thrust means on said driven member engageable with said housing when said ring is pressure loaded against said wall portion to limit axial movement of said driven member.

4. A multiple disk clutch including a housing, coaxial drive and driven members rotatably mounted in said housing, first and second sets of coaxial clutch elements respectively mounted on said drive and driven members and interleaved to form a stack, a first pressure applying member on said driven member at one side of said stack, a second pressure applying member mounted on said driven member for rotation therewith and for axial movement relative thereto, means including a spring carried by said driven member and engaging said second pressure applying member for urging the latter in a direction to compress the stack of clutch elements and engage the clutch, means including a radially extending wall portion on said driven member defining an annular cylinder, an annular piston in said cylinder engageable with said second pressure applying member for moving the latter axially away from the stack of clutch elements when fluid under pressure is supplied to said cylinder, said radially extending wall portion having a passage extending therethrough and spaced radially outwardly from the axis of said driven member, an annular distributor ring means mounted on said housing for axial sliding movement and having one end face thereof engaging said wall portion in overlying relation to said passage therein, said end face having passage means extending therethrough from said one end face to the other end face thereof, means for selectively supplying fluid under pressure to said other end face of said ring means to pressure load said ring means against said wall portion into close running fit therewith and to supply fluid under pressure to said cylinder to disengage the clutch, said ring means applying an axial thrust in one direction to said driven member correlative with the fluid pressure applied to said other end of said ring means, and means on said driven member engageable with said housing when said driven member is urged in said one direction to limit axial movement of said driven member and to retard rotation thereof.

5. The combination of claim 4 wherein said one end face of said ring means defining an annular groove therein narrower than said other end face of said ring means and inner and outer seal faces on opposite sides of said groove, the combined area of said seal faces and said groove at said one end of the ring means being greater than the area at said other end of said ring means by an amount such that the fluid pressures acting on said one end of said ring means substantially counterbalance the fluid pressure acting on said other end of said ring.

6. A multiple disk clutch including a housing, an input member rotatably mounted in said housing and including an input shaft and an input cage spaced radially outwardly of said input shaft, an output member rotatably mounted in said housing and including an output shaft and an output cage spaced radially outwardly from said output shaft and connected thereto by a radially extending wall portion, said output cage being disposed radially inwardly of said input cage, and first and second sets of clutch elements carried by said input and output cages and interleaved to form a stack of elements, a first pressure applying element on said output cage at one side of said stack, a second pressure applying element slidably and non-rotatably mounted on said output cage at the other side of said stack, said output shaft and said output cage defining an annular cylinder therebetween at the side of said wall portion adjacent said input member, and disposed radially inwardly of said stack of elements, an annular piston slidably disposed in said cylinder and operatively connected to said second pressure applying member for moving the second pressure member away from said stack of elements to release the clutch, a spring on said output shaft engaging said piston to yieldably urge said piston in the direction to engage the clutch, and means including a passage in said output member for selectively supplying fluid under pressure to said cylinder to move the piston therein.

7. A multiple disk clutch including a housing, an input member rotatably mounted in said housing and including an input shaft and an input cage spaced radially outwardly of said input shaft, an output member rotatably mounted in said housing and including an output shaft and an output cage spaced radially outwardly from said output shaft and connected thereto by a radially extending wall portion, said output cage being disposed radially inwardly of said input cage, and first and second sets of clutch elements carried by said input and output cages and interleaved to form a stack of elements, a first pressure applying element on said output cage at one side of said stack, a second pressure applying element slidably and non-rotatably mounted on said output cage at the other side of said stack, said output shaft and said output cage defining an annular cylinder therebetween at the side of said wall portion adjacent said input member, and disposed radially inwardly of said stack of elements, an annular piston slidably disposed in said cylinder and operatively connected to said second pressure applying member for moving the second pressure member away from said stack of elements to release the clutch, a spring on said output shaft engaging said piston to yieldably urge said piston in the direction to engage the clutch, said radially extending wall portion having a passage extending therethrough at a point radially outwardly of said output shaft, a collector ring means slidably and non-rotatably mounted on said housing and having one end face in running engagement with said wall at the side opposite said cylinder, said ring means having passages extending therethrough from said one end face to the other end face thereof, and means for selectively supplying fluid under pressure to said other end face of the ring means to pressure load the ring means against the output member and to simultaneously supply fluid to the cylinder to operate the piston.

8. The combination of claim 7 including thrust means on said output shaft engageable with said housing to limit axial movement of the output member when said ring is pressed thereagainst.

9. The combination of claim 8 wherein said thrust means and said housing have brake means on the interengaging surfaces thereof for retarding rotation of said output member when pressure is supplied to said ring means.

10. The combination of claim 7 wherein said passage in said wall portion is located adjacent the radially outer portion of said annular cylinder.

11. A multiple disk clutch including a housing, a first member rotatably mounted in said housing and including a first shaft and a first cage spaced radially outwardly of said flat shaft, a second member rotatably mounted in said housing and including a second shaft and a second cage spaced radially outwardly from said second shaft and connected thereto by a radially extending wall portion, said second cage being disposed radially inwardly of said first cage, and first and second sets of clutch elements carried by said first and second cages and interleaved to form a stack of elements, a first pressure applying element on said second cage at one side of said stack, a second pressure applying element slidably and rotatably mounted on said second cage at the other side of said stack, said second shaft and said second cage defining an annular cylinder therebetween at one side of said wall portion and spaced radially inwardly of said stack of elements, an annular piston slidably disposed in said cylinder and operatively connected to said second pressure applying member for moving said member in one direction relative to the stack of elements, a spring on said second member engaging said piston to yieldably urge said piston in the other direction, and means including a passage in said second member for selectively supplying fluid under pressure to said cylinder.

12. The combination of claim 11 wherein said passage is located in said wall portion at a point spaced radially outwardly of said second shaft, said pressure supplying means including a collector ring slidably and non-rotatably mounted on said housing and having an end face in running engagement with said wall opposite said cylinder for supplying fluid under pressure to said cylinder.

References Cited in the file of this patent

UNITED STATES PATENTS

| | | |
|---|---|---|
| 2,583,556 | Fleischel | Jan. 29, 1952 |
| 2,653,833 | Barron | Sept. 29, 1953 |
| 2,709,926 | Jandasek | June 7, 1955 |
| 2,870,655 | Rockwell | Jan. 27, 1959 |
| 2,879,868 | Eakin | Mar. 31, 1959 |
| 2,901,066 | Garmager | Aug. 25, 1959 |